(12) United States Patent
Lee et al.

(10) Patent No.: US 10,528,766 B2
(45) Date of Patent: Jan. 7, 2020

(54) TECHNIQUES FOR MASKING ELECTRONIC DATA

(71) Applicant: JPMorgan Chase Bank, N.A., New York, NY (US)

(72) Inventors: Felix C. P. Lee, North Point (HK); Jacky C. T. Chan, Ho Man Tin (HK); Lydia L. C. Wong, Mid-levels (HK)

(73) Assignee: JPMORGAN CHASE BANK, N.A., New York, NY (US)

( * ) Notice: Subject to any disclaimer, the term of this patent is extended or adjusted under 35 U.S.C. 154(b) by 330 days.

(21) Appl. No.: 15/612,038

(22) Filed: Jun. 2, 2017

(65) Prior Publication Data

US 2019/0362102 A1    Nov. 28, 2019

Related U.S. Application Data

(60) Provisional application No. 62/344,724, filed on Jun. 2, 2016.

(51) Int. Cl.
*G06F 21/64* (2013.01)
*G06F 17/27* (2006.01)

(52) U.S. Cl.
CPC ............ *G06F 21/64* (2013.01); *G06F 17/271* (2013.01)

(58) Field of Classification Search
CPC .............................. G06F 21/64; G06F 17/271
See application file for complete search history.

(56) References Cited

U.S. PATENT DOCUMENTS

| | | | | |
|---|---|---|---|---|
| 8,458,487 | B1* | 6/2013 | Palgon | G06F 21/00 380/277 |
| 2013/0144901 | A1* | 6/2013 | Ho | G06F 16/248 707/769 |
| 2014/0123303 | A1* | 5/2014 | Shukla | G06F 21/6254 726/26 |
| 2017/0004124 | A1* | 1/2017 | Kyre | G06F 17/245 |
| 2017/0339111 | A1* | 11/2017 | Balabine | G06F 21/602 |
| 2018/0276393 | A1* | 9/2018 | Allen | G06F 3/0482 |

* cited by examiner

*Primary Examiner* — Michael R Vaughan
(74) *Attorney, Agent, or Firm* — Greenblum & Bernstein, P.L.C.

(57) ABSTRACT

Embodiments of the present invention provides a data protection solution for data extraction, masking, and transfer from production data sources to a non-production environment. With the disclosed techniques, sensitive data may be securely and randomly masked while the format of the masked data, referential integrity of records, and/or data validation rules are preserved for purposes of application or system testing.

23 Claims, 4 Drawing Sheets

TECHNIQUES FOR MASKING ELECTRONIC DATA

CROSS-REFERENCE TO RELATED APPLICATION(S)

This patent application claims the benefit of U.S. Provisional Application No. 62/344,724, filed Jun. 2, 2016, which is incorporated herein by reference in its entirety.

FIELD OF THE INVENTION

Embodiments of the present invention relate generally to the fields of electronic databases and data security. More particularly, the present invention relates to improved techniques for masking sensitive data from various data sources, such as data extraction, masking, and transfer from production data sources to a non-production environment.

BACKGROUND OF THE INVENTION

Organizations, especially large enterprises, have been making significant, ongoing investments and efforts in preventing sensitive data from being leaked (e.g., from production environment) in order to fulfill the responsibility and requirement of protecting customer and internal data. For example, companies who receive any personally identifiable information (PII), are obligated to safeguard such information pursuant to privacy laws and/or consumer protection laws. At the same time, there is often a need to extract live or production data into a non-production environment, such as UAT (User Acceptance Test) or SIT (System Integration Test), in order to perform meaningful testing on the application or system being developed.

The types of data to be extracted and/or tested often come with different structures, formats, and constraints, and such electronic data typically come from a wide range of sources such as relational databases, data warehouses, big data platforms, as well as unstructured or semi-structured data files. Often, there is no simple way to securely and consistently mask sensitive data along the data path within and between applications and systems. While sensitive data has to be masked securely, there are other requirements on the output of the masked data. For example, the format of the masked data should be preserved, referential integrity of records should be maintained, and data validation rules should not be violated. On the other hand, it is often desirable to also support multilingual masking for multi-byte characters (e.g., Chinese and Japanese characters). These are some examples of requirements that often must be fulfilled at the same time in order to generate meaningful test results based on data coming from multiple upstream sources at multiple intervals. The same also applies to output data that might be consumed by downstream applications or systems.

In prior data-masking approaches, separate masking algorithms are often applied individually on a field by field basis, and a set of different masking rules have to be defined for each masking pass in order to mask data securely and at the same time maintain relationship among data elements. As a result, the process has been tedious, inefficient, and error prone, which often leads to unintended data leakage.

In light of the various deficiencies and problems with existing data-masking methods, there is a need for improved techniques that could securely and reliably mask sensitive data without affecting their usefulness in application or system testing.

BRIEF DESCRIPTION OF THE DRAWINGS

The accompanying drawings, which are included to provide a further understanding of the invention and are incorporated in and constitute part of this specification, illustrate several embodiments of the invention and, together with the description, serve to explain the principles of the invention. The purpose and advantages of the present invention will be apparent to those of skill in the art from the following detailed description in conjunction with the appended drawings.

DETAILED DESCRIPTION OF THE INVENTION

Embodiments of the present invention set forth a set of data-masking techniques know as DREAMS (Data Requisition, Extraction, Automated Masking Service) which provides a data protection solution for data extraction, masking, and transfer from production data sources to a non-production environment, for example. With these data-masking techniques, sensitive data can be masked using a "DREAMS Data Masking Engine" before leaving production environment with the purpose of preventing data leakage.

The DREAMS Data Masking Engine may apply a standard masking ruleset for the majority of sensitive data including personal information.

According to embodiments of the present invention, the DREAMS Data Masking Engine may read data from heterogeneous sources defined by users via parallel processing with concurrent threads, and may apply a consistent set of masking rules to perform data transformation on some or all sensitive data fields, thereby producing masked data output that preferably fulfills one or more of the following six properties:

Irreversibility: The masked data is irreversible, and it is impossible to re-produce, or calculate the original data based on the masked data, with or without the knowledge of the masking algorithms applied.

Secure randomness: The masked data is secure and random, through the use of secure API. The same value will be transformed to different random values in a different masking pass.

Pattern preservation: The masked data preserves the format of the source data, which ensures the compliance of application specific format validation rules.

Key uniqueness: The masked data ensures the uniqueness of all key fields, ensuring no duplication in any key or identifier that must be used to uniquely identify a record or data element.

Referential integrity: The masked data maintains referential integrity of all records, and the value of a foreign key will be transformed to the same value of the corresponding primary key. Data relationship will be maintained in all persistence types that are masked in the same pass.

Multilingual/multi-byte representation: The masked data resumes the same natural language as the source data, when the original character encoding scheme is applied.

The masked output can be written to heterogeneous data destinations that mirror the input sources or have different output persistence types.

In order to achieve the above-described criteria, the DREAMS Data Masking Engine may selectively apply a "secure masking" procedure or a "deterministic masking" procedure in the data transformation stage.

Secure Masking

Figure 1:
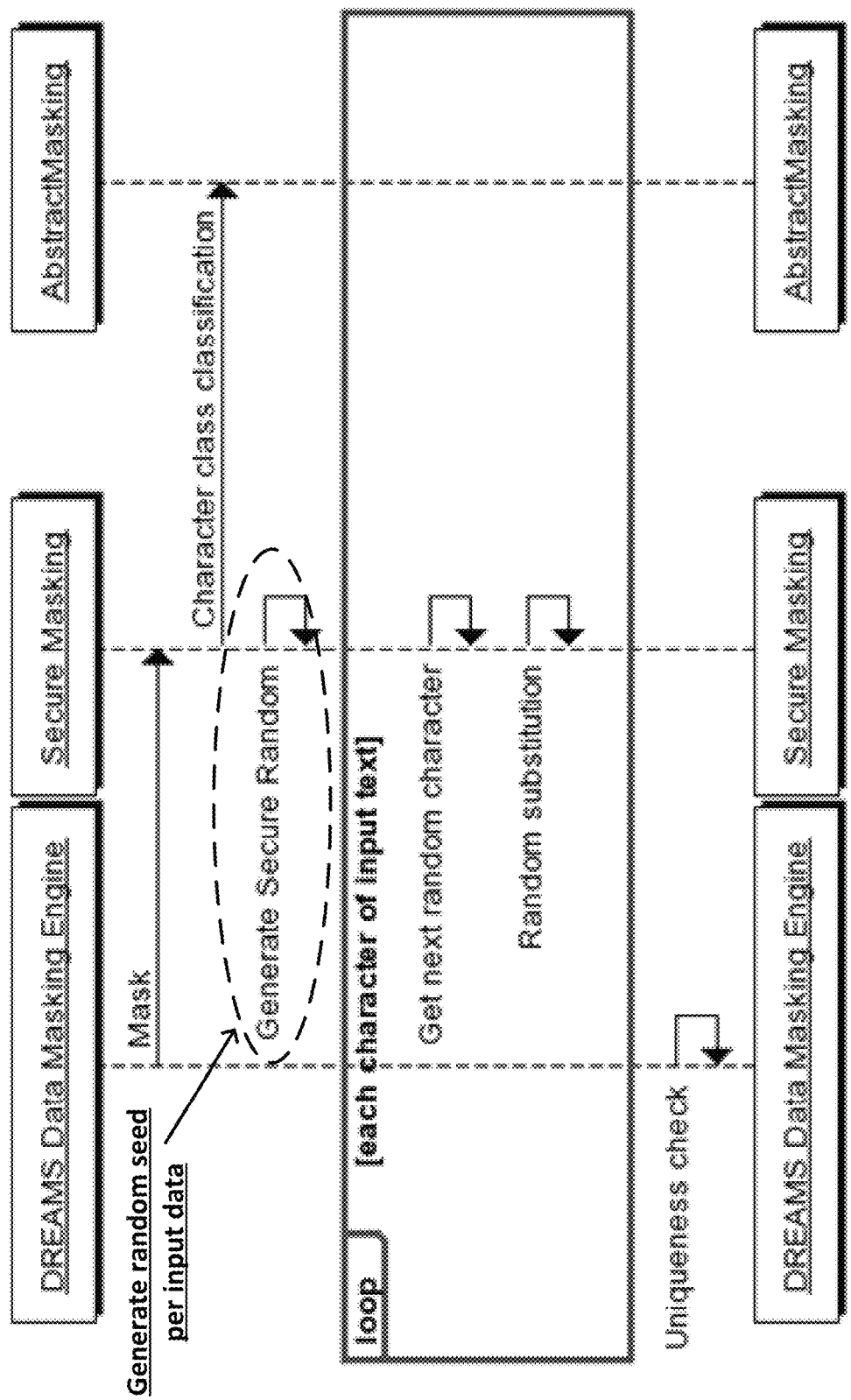
FIG. 1 is a block diagram illustrating an exemplary data masking procedure (Secure Masking) in accordance with one embodiment of the present invention.

FIG. 1 shows a block diagram illustrating an exemplary data masking procedure (Secure Masking) in accordance with one embodiment of the present invention.

In the secure masking procedure, for each masking pass, the characters in the source data stream may be classified into (1) English vowels, (2) English consonants, (3) numerical digits, (4) non-English characters, and (5) symbols, and then placed into different processing queues in memory.

A sequence of valid characters for each character class (except the symbol class) may be created, and for each character class, a random substitution is performed to replace every character in the source data. A SecureRandom object may be created for each input stream using the Java "SecureRandom" API, and the substituting character is picked by a random position, generated by the SecureRandom, in the corresponding valid character sequence. For instance, non-English characters may be treated as hexadecimal values, and the position of the substituting character, within the valid hexadecimal range, may be picked with a random shift value. Special characters or symbols carry no sensitive meaning and will not be randomized in order to preserve the data format.

The masked data is returned in the output stream. The entire masking process can execute in memory without any data preserved to permanent storage.

A uniqueness check may be performed on the masked data to screen out any possible duplication. The masking process can be re-executed if there is any duplication.

Deterministic Masking

Figure 2:
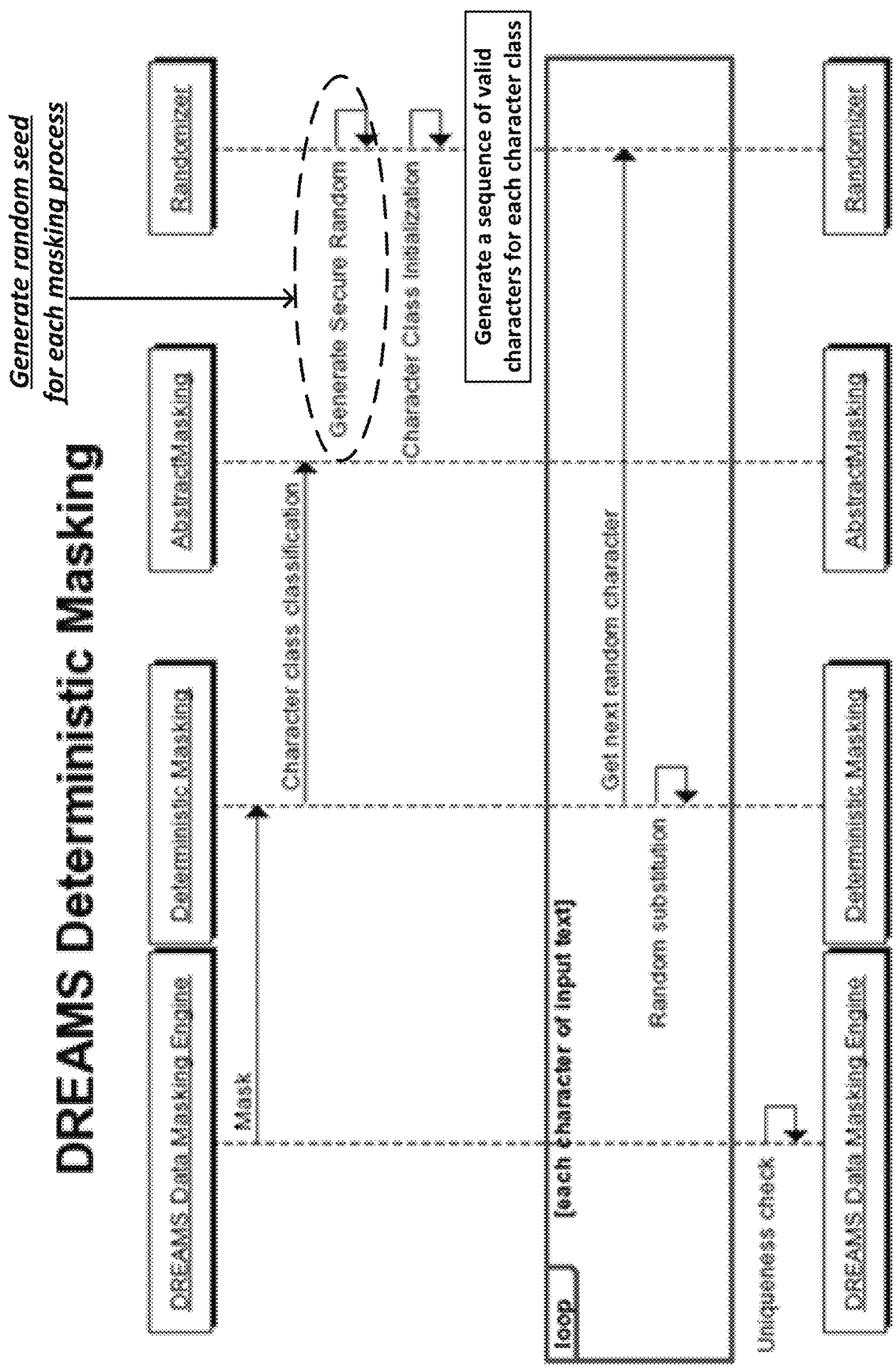
FIG. 2 is a block diagram illustrating an exemplary data masking procedure (Deterministic Masking) in accordance with one embodiment of the present invention.

FIG. 2 shows a block diagram illustrating an exemplary data masking procedure (Deterministic Masking) in accordance with one embodiment of the present invention.

In the deterministic masking procedure, for each masking pass, a SecureRandom object may be generated using the Java "SecureRandom" API. If there are multiple data sources in the same masking pass, the same SecureRandom may be used for all sources with the same or different source types (e.g., database, text files, etc.). This is in contrast to the above-described secure masking procedure where a random seed is generated for each input data or input stream; here, for the deterministic masking procedure, a random seed is generated for each masking process.

The characters in the source data stream may be classified into (1) English vowels, (2) English consonants, (3) numerical digits, (4) non-English characters, and (5) symbols, and then placed into different processing queues in memory.

A sequence of valid characters for each character class (except the symbol class) may be created, and for each character class, a random substitution is performed to replace every character in the source data. The substituting character is picked by a random position, generated by the SecureRandom, in the corresponding valid character sequence. For instance, non-English characters may be treated as hexadecimal values and the position of the substituting character, within the valid hexadecimal range, will be picked with a random shift value. Special characters or symbols carry no sensitive meaning, and will not be randomized in order to preserve the data format.

The masked data is returned in the output stream. The entire masking process can execute in memory without any data preserved to permanent storage.

A uniqueness check will be performed on the masked data to screen out any possible duplication. The masking process will be re-executed if there is any duplication.

An Example of Data Masking

Figure 3:
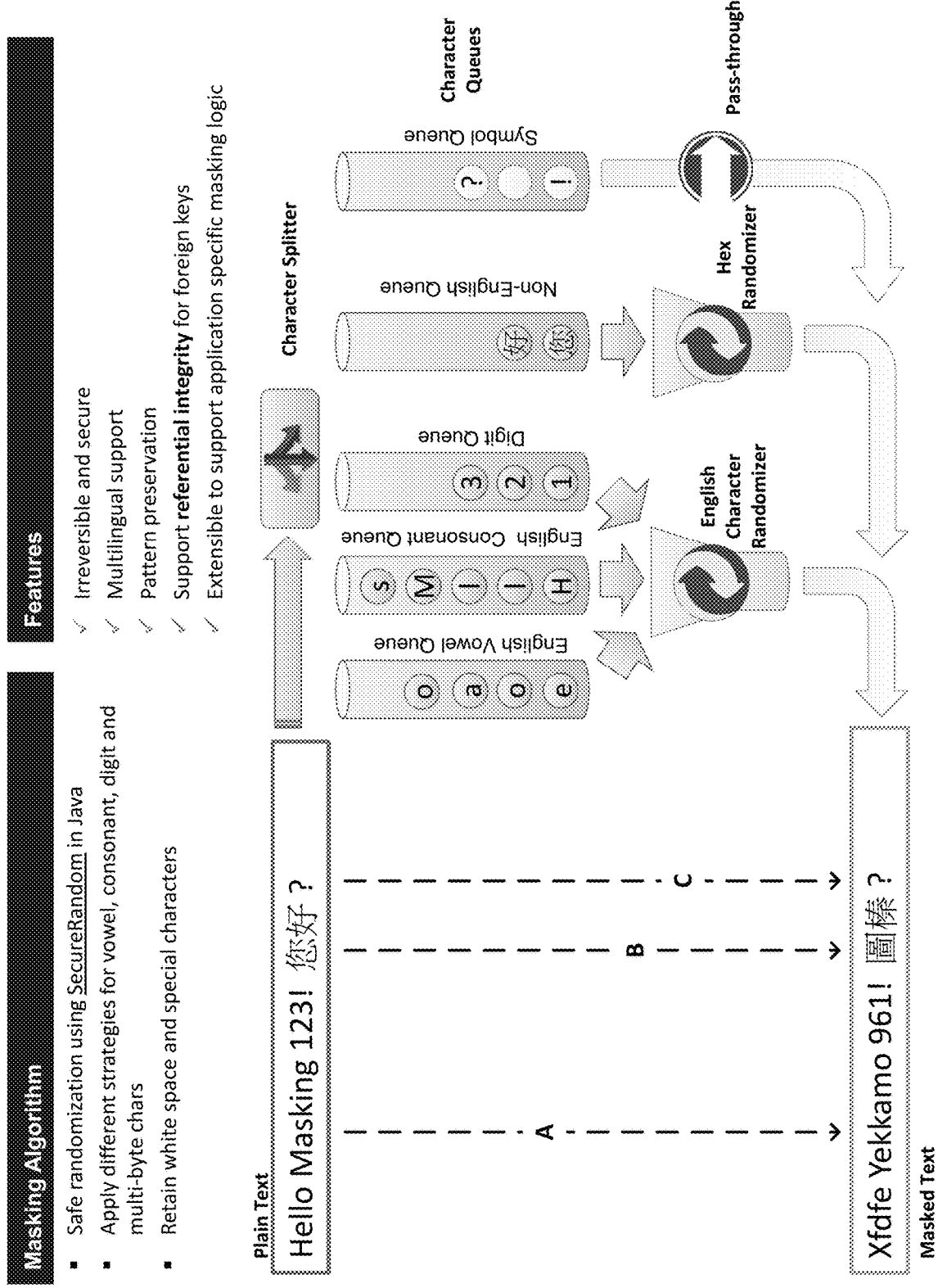
FIG. 3 is a block diagram illustrating an exemplary data masking algorithm with an example in accordance with one embodiment of the present invention.

FIG. 3 shows a block diagram illustrating an exemplary data masking algorithm with an example in accordance with one embodiment of the present invention.

As shown, an original piece of plain text "Hello Masking 123! 您好" may require masking based on either of the above-described procedures.

First, the plain text string may be fed to a character splitter that parses the characters into categories such as (1) English vowels, (2) English consonants, (3) numerical digits, (4) non-English characters, and (5) symbols. Corresponding memory queues may be set up to store the respective categories of sorted characters.

Next, characters belonging to Categories (or Queues) (1)-(3) may be inputted to an English character randomizer so that each character can be replaced with a random character in the same category. In this example, the string of English letters and numbers "Hello Masking 123" is replaced with "Xfdfe Yekkamo 961" (as indicated by dash line A in FIG. 3).

Similarly, the characters in the non-English queue may be inputted to a hex randomizer so that each character may be replaced with a random one in the same category. In this example, two randomly selected Chinese characters "圖榛" takes the place of the two original Chinese characters "您好" (as indicated by dash line B in FIG. 3).

As to symbols, such as space and punctuation marks (e.g., "!" and "?"), those characters are passed through into the string of masked text without any change (as indicated by dash line C in FIG. 3).

As a result, the original string of plain text "Hello Masking 123! 您好?" is transformed into the string of masked text "Xfdfe Yekkamo 961! 圖榛?" which securely and randomly masks the original data.

Computer Implementation

Figure 4:
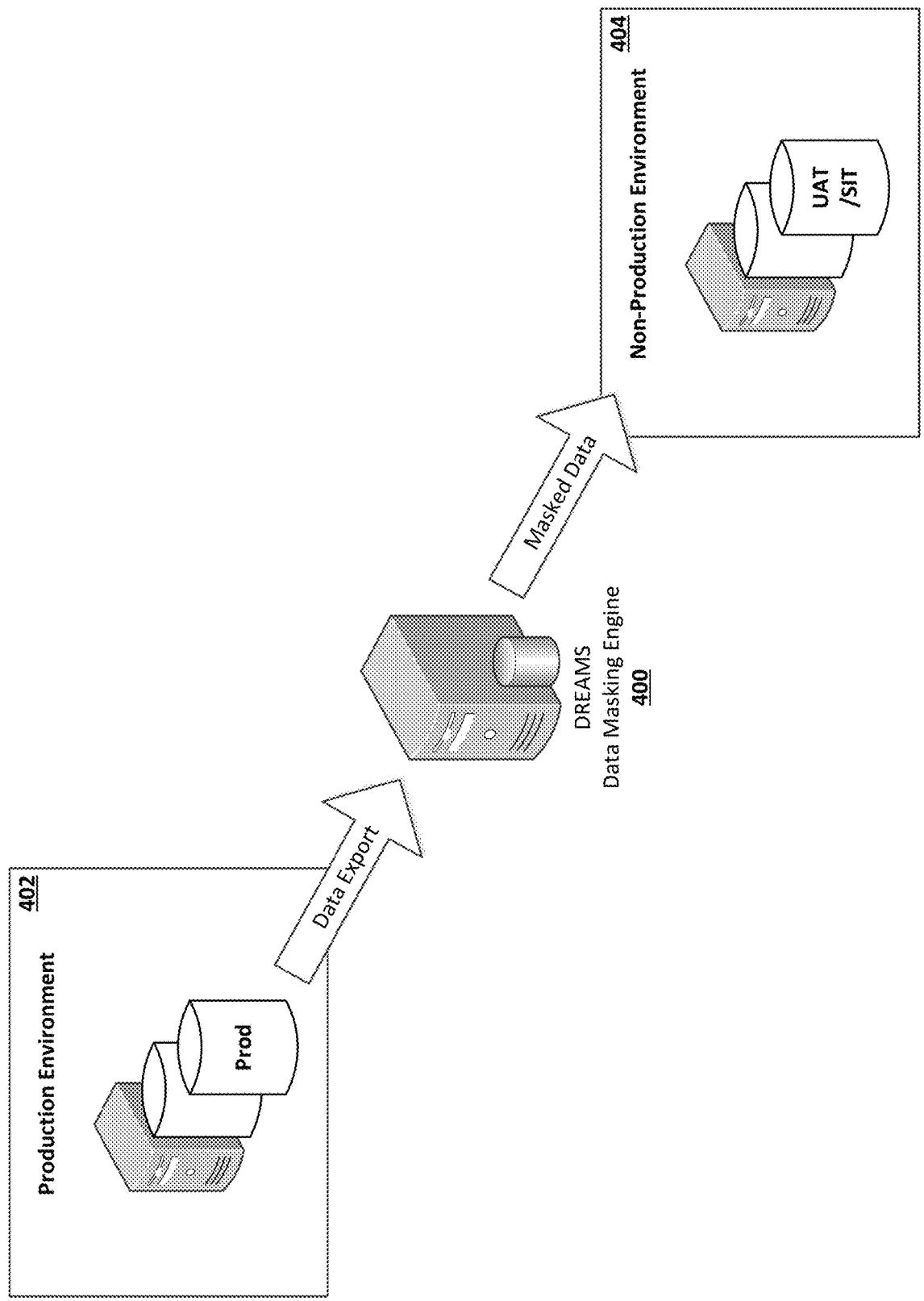
FIG. 4 shows a block diagram illustrating an exemplary system for data masking in accordance with one embodiment of the present invention.

As shown in FIG. 4, the components used to implement embodiments of the present invention may be or include a computer or multiple computers. The components may be described in the general context of computer-executable instructions, such as program modules, being executed by a computer. Generally, program modules include routines, programs, objects, components, data structures, etc. that performs particular tasks or implement particular abstract data types.

Those skilled in the art will appreciate that embodiments of the present invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or non-volatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. A plurality of software processing modules may be stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/non-volatile computer storage media. For example, a hard disk drive may read or write to non-removable, non-volatile magnetic media. A magnetic disk drive may read from or writes to a removable, non-volatile magnetic disk, and an optical disk drive may read from or write to a removable, non-volatile optical disk such as a CD ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown or described here, those of ordinary skill in the art will appreciate that such components and the interconnections are well known. Accordingly, additional details concerning the internal construction of the computer need not be disclosed in connection with the present invention.

In operation, a computer processor or the like in a computer or server system may be configured with a special set of program instructions to automatically perform security filtering functions consistent with the methodology described above.

More particularly, a DREAMS Data Masking Engine 400, which may be a dedicated computer with its own storage device and communication interfaces, may be deployed between a Production Environment 402 and a Non-Production Environment 404. The DREAMS Data Masking Engine 400 effectively intercepts any data export from the Production Environment 402 and determines whether any data masking should be applied to the exported data. For sensitive data requiring masking, the DREAMS Data Masking Engine 400 may apply one or more masking algorithms (e.g., the Secure Masking or Deterministic Masking as described above) to the exported data and then output the masked data stream to the Non-Production Environment 404.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the patent claims ultimately issued from this application.

The invention claimed is:

1. A computer-implemented method for masking sensitive data extracted from data sources while preserving at least data format and referential integrity, the method comprising:
receiving an input stream from one or more data sources, said input stream containing electronic data in a predetermined sequence;
splitting said electronic data into multiple categories including at least alphanumerical characters, symbols and other characters;
first substituting, using an English character randomizer, each character in the alphanumerical characters category with an alphanumerical character that is substantially randomly selected, thereby generating at least one masked alphanumerical character set;
second substituting, using a hex randomizer, each character in the other characters category with a character of a same type that is substantially randomly selected, thereby generating at least one second masked character set; and
re-assembling an output stream containing masked electronic data based at least in part on said symbols without substitution, said at least one masked character set and said at least one second masked character set while maintaining said predetermined sequence in said output stream.

2. The method of claim 1, further comprising:
splitting said electronic data into character queues corresponding to said multiple categories.

3. The method of claim 2, wherein said character queues corresponding to the multiple categories are placed into respective processing queues in a computer memory before the first substituting and the second substituting.

4. The method of claim 1,
wherein the electronic data includes at least an English vowel, an English consonant, a digit, a non-English character, and a symbol, and the method further comprises:
splitting said electronic data into the following character queues: (1) English vowels queue, (2) English consonants queue, (3) digits queue, (4) non-English characters queue, and (5) symbols queue.

5. The method of claim 1, wherein said symbols in said electronic data of said input stream remains unchanged in said output stream.

6. The method of claim 1, further comprising:
generating one or more random seeds to facilitate a substantially random selection of replacement characters.

7. The method of claim 6, wherein a single random seed is generated for multiple input streams.

8. The method of claim 6, wherein a different random seed is generated for each input stream or each unit of the electronic data in said input stream.

9. The method of claim 1, further comprising:
performing a uniqueness check on said masked electronic data of the output stream to screen out any possible duplication.

10. The method of claim 1, further comprising:
generating a sequence of valid characters for each category of characters; and
selecting a replacement character from said sequence of valid characters based on a random position.

11. The method of claim 1, further comprising:
treating a category of non-English characters as a range of hexadecimal values; and
selecting a replacement non-English character from said hexadecimal range based on a random shift value.

12. The method of claim 1, wherein the receiving, the splitting, the substituting of each character in the other characters category, the substituting of each character in the other characters category and the re-assembling are executed in a computer memory without preserving any data to a permanent storage medium.

13. A non-transitory computer-readable medium having code for masking sensitive data extracted from data sources while preserving at least data format and referential integrity, the computer-readable medium comprising processor instructions configured to cause a processor to perform:

receiving an input stream from one or more data sources, said input stream containing electronic data in a predetermined sequence;

splitting said electronic data into multiple categories including at least alphanumerical characters symbols and other characters;

first substituting, using an English character randomizer, each character in the alphanumerical characters category with an alphanumerical character that is substantially randomly selected, thereby generating at least one masked alphanumerical character set;

second substituting, using a hex randomizer, each character in the other characters category with a character of a same type that is substantially randomly selected, thereby generating at least one second masked character set; and re-assembling an output stream containing masked electronic data based at least in part on said symbols without substitution, said at least one masked character set and said at least one second masked character set while maintaining said predetermined sequence in said output stream.

14. A computer-implemented system for masking sensitive data extracted from data sources while preserving at least data format and referential integrity, the system comprising:

a data communication interface configured to receive an input stream from one or more data sources, said input stream containing electronic data in a predetermined sequence;

a computer processor coupled to a random access memory, the computer processor configured to:

split said electronic data into multiple categories including at least alphanumerical characters, symbols and other characters;

first substitute, using an English character randomizer, each character in the alphanumerical characters category with an alphanumerical character that is substantially randomly selected, thereby generating at least one masked alphanumerical character set;

second substitute, using a hex randomizer, each character in the non-English characters category with a character of a same type that is substantially randomly selected, thereby generating at least one second masked character set; and re-assemble an output stream containing masked electronic data based at least in part on said symbols without substitution, said at least one masked character set and said at least one second masked character set while maintaining said predetermined sequence in said output stream.

15. The system of claim 14, further configured to:
split said electronic data into character queues corresponding to said multiple categories.

16. The system of claim 15, wherein said character queues corresponding to the multiple categories are placed into respective processing queues in said random access memory, and wherein said output stream containing said masked electronic data is generated without preserving any data to a permanent storage medium.

17. The system of claim 14,
wherein the electronic data includes at least an English vowel, an English consonant, a digit, a non-English character, and a symbol, and the method further comprises:

split said electronic data into the following character queues: (1) English vowels queue, (2) English consonants queue, (3) digits queue, (4) non-English characters queue, and (5) symbols queue.

18. The system of claim 14, further configured to:
generate one or more random seeds to facilitate a substantially random selection of replacement characters.

19. The system of claim 18, wherein a single random seed is generated for multiple input streams.

20. The system of claim 18, wherein a different random seed is generated for each input stream or each unit of the electronic data in said input stream.

21. The system of claim 14, further configured to:
perform a uniqueness check on said masked electronic data of the output stream to screen out any possible duplication.

22. The system of claim 14, further configured to:
generate a sequence of valid characters for each category of characters; and
select a replacement character from said sequence of valid characters based on a random position.

23. The system of claim 14, further configured to:
treat a category of non-English characters as a range of hexadecimal values; and
select a replacement non-English character from said hexadecimal range based on a random shift value.

* * * * *